(No Model.)  3 Sheets—Sheet 1.
L. J. TRACY.
DEODORIZING HEATING APPARATUS.
No. 538,137. Patented Apr. 23, 1895.
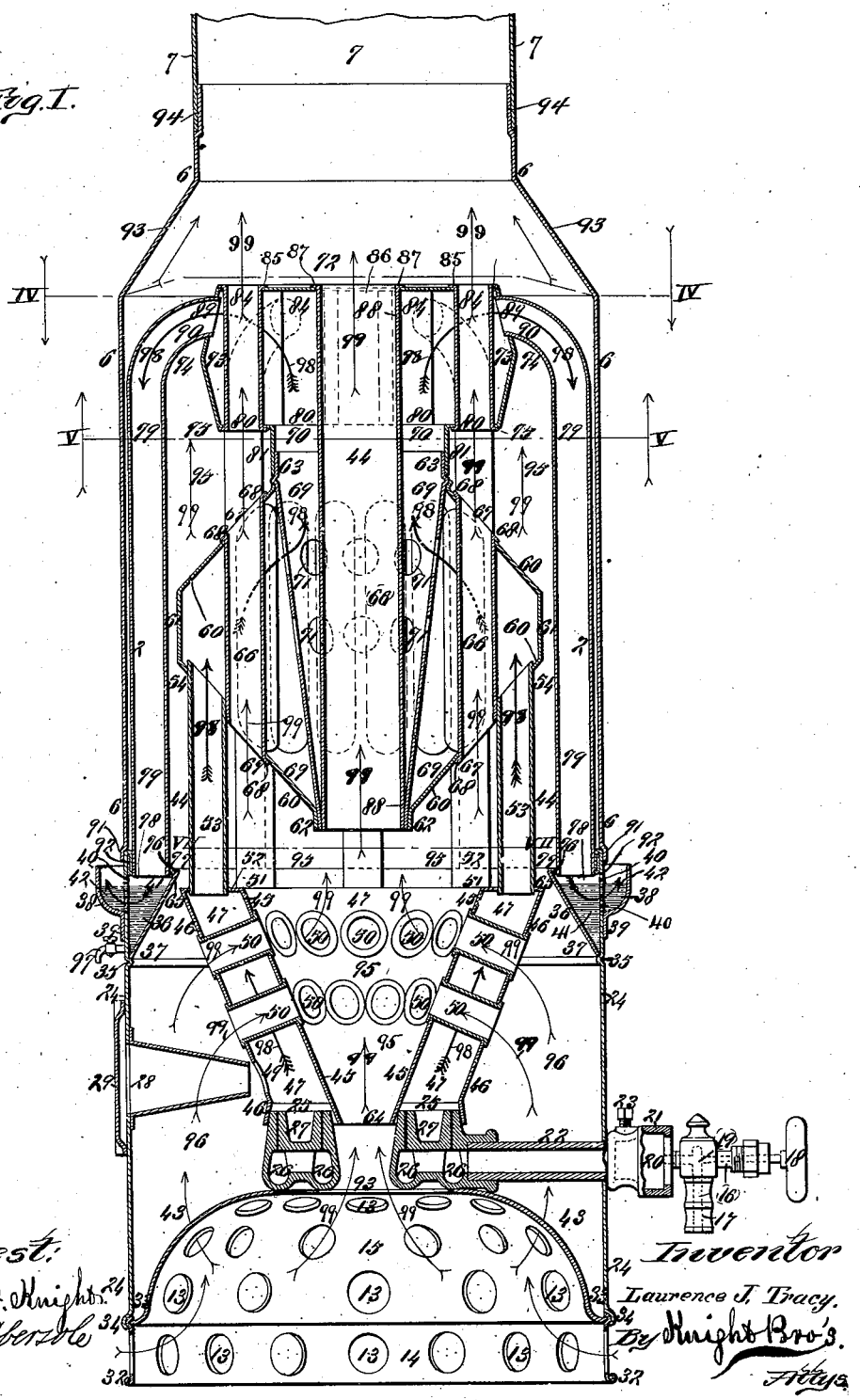
Fig. I.
Attest:
Benj. A. Knight
A. M. Eberzole
Inventor
Laurence J. Tracy.
By Knight Bro's.
Attys.

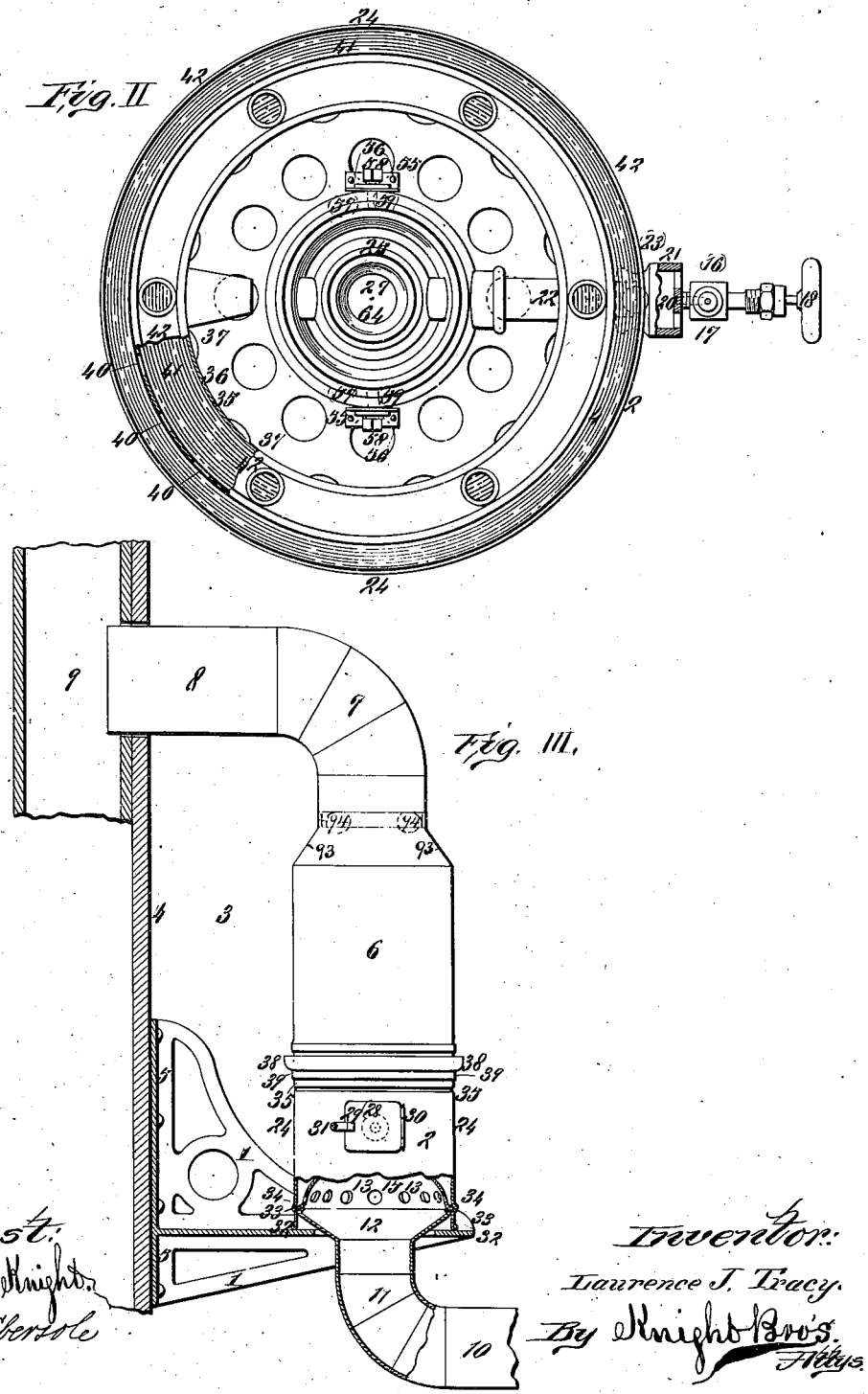
(No Model.)
L. J. TRACY.
DEODORIZING HEATING APPARATUS.
No. 538,137. Patented Apr. 23, 1895.

(No Model.) 3 Sheets—Sheet 3.
L. J. TRACY.
DEODORIZING HEATING APPARATUS.
No. 538,137. Patented Apr. 23, 1895.
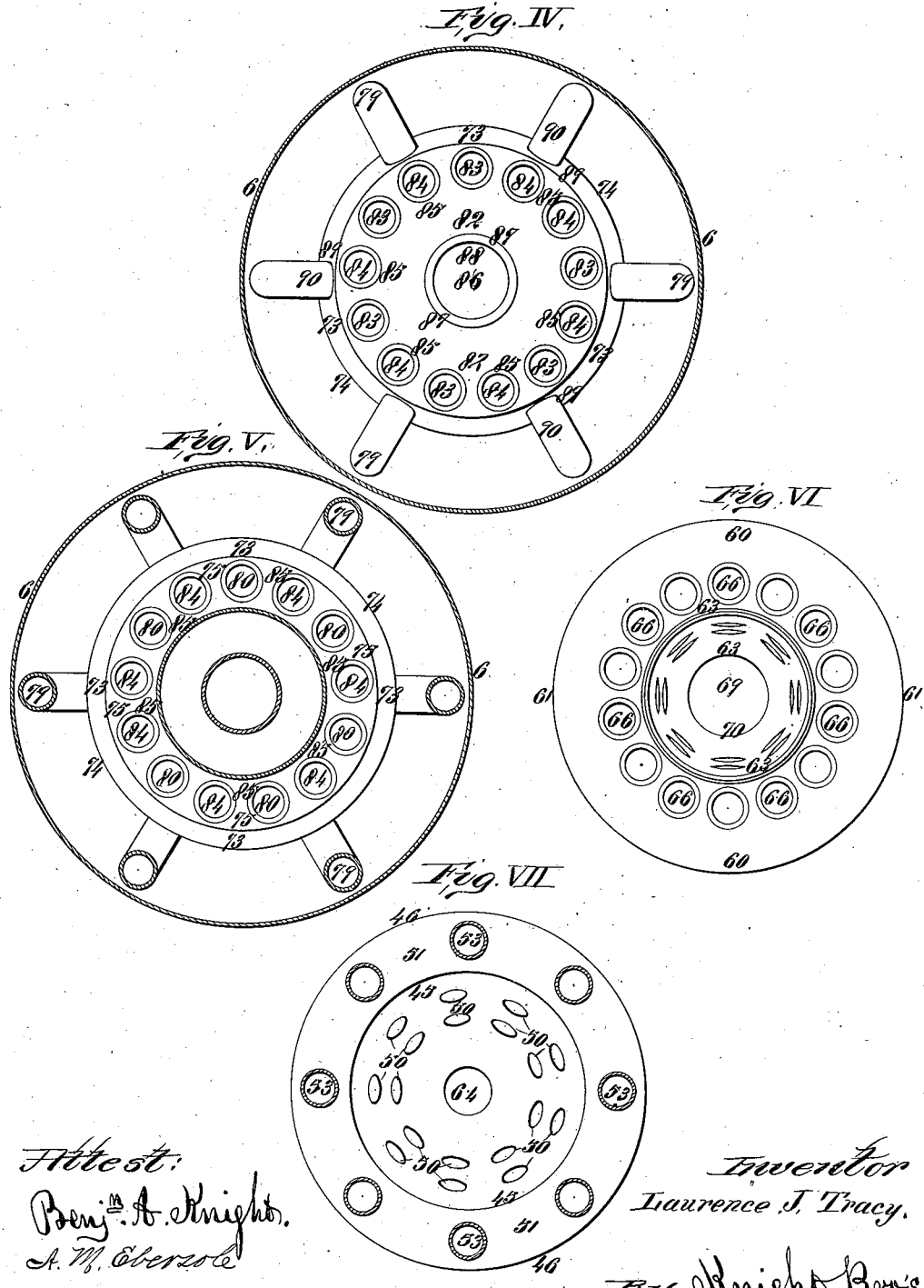

UNITED STATES PATENT OFFICE.

LAURENCE J. TRACY, OF ST. LOUIS, MISSOURI.

DEODORIZING HEATING APPARATUS.

SPECIFICATION forming part of Letters Patent No. 538,137, dated April 23, 1895.

Application filed October 9, 1893. Serial No. 487,586. (No model.)

*To all whom it may concern:*

Be it known that I, LAURENCE J. TRACY, of the city of St. Louis, in the State of Missouri, have invented a certain new and useful Improvement in Deodorizing Heating Apparatuses, of which the following is a full, clear, and exact description, reference being had to the accompanying drawings, forming part of this specification.

This invention relates to a heating apparatus in which gas, oil or other fluid combustible may be used to generate the heat, and which is supplied with a double system of tubes and transmission chambers through which respectively the hot products of combustion on the one part, and the heated air on the other part, are conveyed without from their first inception to their exit coming in contact with each other; the obnoxious odors and unhealthy products of combustion being thus held captive from the heated air, and the ultimate discharge of the fumes from said product being purified by its passage over and through a circumferential deodorizing water bath; and the invention consists in features of novelty hereinafter fully described and pointed out in the claims.

Figure I is a vertical section of the heater, and shows the supply pipe, the burner, the hand tube for igniting said burner, the tubes and chambers for the separate conduct of the hot products of combustion and of the heated air, and the circumferential deodorizing water bath. Fig. II is a top view of the bottom section of the heater proper, and shows the perforate base, the supply pipe and valve, the burner and its set-screw attachment, the final return pipes for the hot products of combustion, and the deodorizing water bath that receives the final discharge, with part broken away to show the interior division of said deodorizing water bath. Fig. III is a side, diminished view of the heater set up in the basement, its bracket support, air supply pipe, hood, elbow flue, and hot air pipe, with part broken away to show the initial air ports into the heater. Fig. IV is a top view, and shows the hot air vent flues, and the elbow return flues, that return the hot products of combustion to the final return flues, of the third section of the heater, and it also shows the center hot air vent. Fig. V is an inverted or under view of the parts shown in Fig. IV, and also shows the chamber for the inclosure and passage of the hot products of combustion. Fig. VI is a top view of the second or internal section of the heater, and shows the hot air flues that discharge from the same, the two series of internal vents, for the passage of the hot products of combustion into their inner chamber, and the center hot air flue; and Fig. VII is a lower, inverted view of said internal section, and shows the flues for the ascent of the hot products of combustion, and the concentric air ports for the supply and passage of air to the hot air tubes.

Referring to the drawings:—1 represents the bracket that supports the heater 2, and 3 is the room in which the heater is placed, which is frequently, but not necessarily the basement of the building, for the heater or heaters are alike constructed to be operated either in said basement or in the separate rooms of the building. 4 is the wall to which said bracket is secured by the bolts 5.

When the heater is placed in the basement, or in any room other than that to which it distributes its hot air supply, a hood 6 surmounts the top of the heater inclosing all its hot air discharge, and the elbow-joint 7 and pipe-joint 8 connect with the transfer pipe 9, that transmits the hot air from said basement or room to any other room or rooms that it is required to warm.

10 represents the air supply pipe which may, if preferred, pass out through the basement wall or wall of the room, so as to secure an abundant supply of fresh, undeteriorized air direct from the outer atmosphere. 11 is an elbow-pipe with a flaring top 12, that connects said fresh air supply pipe to the base of the heater around its circumferential series of air supply ports 13 in the base foot rim 14 and in the aerating base dome 15 of the heater, which dome has a center air supply opening 95.

I will describe the invention with the use of gas, and no substantial change is required when oil and other liquid generators of combustion are used. It may also be stated that in the vertical section of the heater proper shown in Fig. I and described below, the heavy arrows indicate the course of the hot products of combustion, and the light arrows the course of the air both before and after it is heated, both of them through their intricate and co-adjacent channels.

16 represents the angle branch gas supply pipe, which passes through the pendent tube 17 which gas is turned on and off by the valve disk 18, that operates the valve 19.

20 is the aerating chamber within the head 21 that is secured to the projecting end of the aerated gas supply pipe 22 by the set-screw 23.

24 is the outer cylindrical casing of the lower section of the heater.

25 is the duplex, circle burner, the aerated gas to which is supplied by the duplex circle base tubes 26, through the duplex circle slots 27.

55 are metal angle lugs that are fastened by rivets 56 in the perforated base dome 15, and in perforations 57 therein the set-screws 58 are seated and are secured in their screw-seats 59 in said burner.

28 represents the conical entrance tube through said casing 24, that passes in a direct line toward the duplex burner for the admission of the match or torch that lights the gas, and 29 is the door that closes and opens the passage to said ignition entrance tube, which door is hung by hinges 30, and fastened by the catch 31.

32 represents a curved peripheral foot around the lower edge of the rim 14, and 33 is a curved flange around the top of said rim, which flange embraces the foot of the perforate aerating base dome 15.

34 is a curved flange around the foot edge of the casing 24, which flange engages around said upper flange of said foot rim 14, and thus makes a tight joint. 35 represents a peripheral rim flange around near the top of said casing 24. 36 is an inwardly and upwardly slanting cup flange, the foot of which rests on said flange rim 35, having a water tight joint 37 thereto. 76 is an inwardly turned horizontal rim, the outer periphery of which is tight soldered to the inside of said outer cylinder casing 24, near its top over the cup 36 of the water tank 42, and the inner edge of said rim is tightly secured to the inwardly turned flange 77 of said inclined cup 36. 78 are a series of perforations in said rim, for the seating of the exit ends of the final discharge tubes 79 for the discharge of the exhausted hot products of combustion, said tubes hereinafter described in connection with the third detachable section of the heater proper. 38 represents a peripherally extending circular cup flange, around the outside at near the top of said casing 24, about opposite said inner cup flange, and 39 is an attachment flange at the foot of said outer cup that is securely soldered to said casing 24. 40 are perforations through said casing 24, communicating from said cup to cup, and 41 is the water that with its circumferential cups constitutes a water bath tank 42. The above named parts from the air supply ports 13 to the water tank 42 inclusive, constitute the lower, or basement attachable and detachable section 43 of the heater proper, that is inclosed within the said casing 24. 44 represents the second or middle detachable section of said heater proper, the bottom of which approaches to the shape of a double inverted cone, or frustum, except that the same is hollow, having an inner wall 45, and outer wall 46, providing the initial flaring flue 47, between said circular incasements for the ascent of the hot products of combustion direct from the duplex circular burner 25, which the circular foot 48 of said flue embraces, so as to collect all the heat from said burner, and at the same time confine it from direct contact with the heating and heated air. 49 represents an opening into said flue opposite the conical igniting entrance tube 28, to allow the passage of the match or torch. 50 are two series of concentric air flues that pass inward on an upward incline through the flaring flue 47, the said flues for heating the air being isolated by their casings from the hot products of combustion that ascend through said flue 47, and thus as throughout the whole system the heating air and the hot products of combustion never come in contact with each other. 51 represents the cap plate of said flaring flue 47, in the perforations 52 in which the vertical flue tubes 53 are seated, through which flues the hot products of combustion further extend and pass through perforation 54 in the lower inclined side of the double truncated hollow cone or frustum 60, the said double frustum having a truncated junction rim 61 in its extreme periphery, and having lower and upper projecting flanges 62 and 63 at its ends.

64 represents a center air vent, at the lower terminal of the inner casing 45 of the flaring flue 47, and 65 is a narrow circumscribed air vent and trap all around between the upper, outer flaring periphery of the outer casing 46 of the flue 47, and the cup flange 36 of the water tank. The said narrow vent allows sufficient air to pass directly upward through the same, while at the same time it serves as a trap to arrest the main volume of air and force it through the two series of concentric air flues 50, which air flues pass through the intensely heated products of combustion that are ascending through the flaring double wall flue 47. 66 represents a series of vertical air tubes that pass through respective lower and upper perforations 67 in said double, hollow truncated frustum, and their ends are tightly secured by their turned over flanged edges 68, that tightly fit around said perforations 67. The hot air passing through said tubes or flues becomes still further heated by the hot products of combustion within the aforesaid hollow double frustum 60. 69 represents a hollow inverted frustum or funnel shaped casing, the flaring top 70 of which fits with a tight joint within the open top of said double, hollow frustum 60 and projecting therefrom forms the aforesaid flange 63; also the lower end of said casing projects beyond the lower open end of said hollow frustum, and constitutes the aforesaid flange 62. 71 represents a double series of vents for the transmission of the hot products of combustion from said double hollow truncated frustum 60 to the interior of said hollow inverted frustum or funnel 69.

The foregoing parts, commencing with the inner and outer wall 45 and 46 of the initial flue 47, for the transmission of the hot products of combustion to said double hollow truncated frustum 60, and the hollow funnel shaped transmitter 69, with their connecting parts constitute the aforesaid second detachable section 44 of the heater proper.

The third detachable section 72 of said heater proper is composed of the following parts:—73 represents a double hollow frustum cap that inclines inward each way from its horizontal center line 74. 75 is a horizontal bottom rim that turns inward from the bottom of the lower incline of said hollow frustum. 80 are a series of perforations in said rim, and 81 is a downwardly projecting flange tight jointed to said rim, which flange when said third section of the heater is attached engages around the aforesaid upwardly projecting flange 63 section two. 82 represents the top cap plate of said double hollow frustum 73, in which close within its periphery is a series of perforations 83 in line above with the perforations 80 below. 84 represents a series of an equal number with said perforations 80 and 83 of hot air tubes, the flanged terminals 85 below and above of which make respective tight joints around said perforations. 86 is a circular opening in said cap plate around which the peripheral flange 87 of the long pendent central hot air tube 88 effects a tight joint around said central perforation. The interior of said hollow double frustum 73, constitutes the surmounting final drum for the storage of the hot products of combustion as they are delivered thereto by the hollow inverted funnel shaped chamber 69. 89 represents a series of perforations in near the top of the upper incline of the hollow double frustum or drum 73 of an equal number with the aforesaid perforations 78 in the rim that surmounts the aforesaid water bath. 79 are the series of final discharge pipes of the same number of either of said series of perforations, and the elbow tops 90 of said discharge pipes are tight seated in said perforations 89 in said upper hollow frustum or drum and the exit ends of said discharge pipes are tight seated below in said perforations 78 and thus is the final discharge of the now exhausted hot products of combustion forcibly precipitated into and throughout the inner division of the circumferential water bath 41 in the combined inner and outer water tank 42. After washing said products of combustion in the bath within said inner tank, said washed product pases through the aforesaid perforations 40 in said casing 24 into the bath of the outer tanks; where said washed products are finally rinsed and cleansed from all impurities, and thus all unpleasant and unhealthy odors that more or less remain to the last in the hot products of combustion are submerged and retained in the water of said tank, which water when fouled, can be replenished. The aforesaid hood 6 has a foot flange 91, that rests on the triple fold cap 92 at the top of the bottom detachable section of casing 24, and the top of said hood has a reduced incline 93, and countersunk attachment flange 94 that is seated in the aforesaid elbow pipe 7.

I have shown round flues and tubes for the transmission of both the hot products of combustion and of the air it heats, but I do not confine myself to any shape therefor, for it is evident that square, oblong or any other shaped flues and tubes may be used, and be substantially of the same construction and exercise the same functions. Indeed it may sometimes be preferable to use square, or oblong air tubes, so as to present a larger heating surface for the action thereon of the hot products of combustion.

The operation of the device has been almost sufficiently pointed out in the introduction and description of the parts.

When the heater is operated in the room that it heats, the hood 6, and pipes 7, 8 and 9 may be dispensed with; but most generally it is preferable to locate the heater in the basement and sometimes when not in the basement, in some other room than that heated, so as not to require the presence of janitors in offices, &c., during office hours; and then the said hood and pipes are necessary to confine and transmit the heat.

Much objection has been made to gas and other heaters on account of the obnoxious, unhealthy and impure odors that are transmitted from the hot products of combustion to the air they heat.

To correct or avoid and overcome this great and injurious difficulty, it will be seen, as shown and described, that the hot products of combustion in my heater never come in contact with the air they heat, as both in said description and in following the course of the heavy arrows 98 for that of the hot products of combustion, and the light arrows 99 for that of the air, during their whole separated courses, which air is drawn by radiation from the storage air chambers 95 and 96.

It will also be seen that in the chamber 20 and pipe 22, I thoroughly aerate the gas, so that it abounds with atmospheric oxygen to aid and add volume to its combustion.

97 is the draw tap for drawing off the water from the combined inner and outer tank 42 when it becomes foul.

I claim as my invention—

1. In a deodorizing heating apparatus, the combination of a burner, a series of flues and chambers, that transmit the hot products of combustion from said burners, and a distinct separated series of tubes and chambers, in contact with said flues and chambers that transmit air in the course of its supply and heating, an inner and outer bath tank containing water in which said products are washed and rinsed, and the perforated division wall between said tanks, substantially as and for the purpose set forth.

2. In a deodorizing heating apparatus, the combination of the burner and supply pipe, the upward draft flues 47 and 53, the discharge flue 79, with its elbow top 90, and the chambers 60, 63 and 73, that transmit the hot products of combustion and the air tubes 50, 66, 84 and 88, and the air chambers 94, 95 and 96 in which the air is heated out of contact with the hot products of combustion, substantially as shown and described.

3. In a deodorizing heating apparatus, the combination of the duplex burner 25, the aerating and gas supply tubes and chambers, the air chamber 96, the casing 24, the igniting entrance tube 28, the initial combustion flue 47, provided with the opening 49 opposite said tube and the door 29, substantially as shown and described.

4. In a deodorizing heating apparatus, the combination of the burner, the casing 24 inclosing the burner, the dual inner and outer bath tanks in which tanks the products of combustion are respectively washed and rinsed, the said casing 24 provided with the perforate water channels 40 connecting the said tanks, the flues and chambers that transmit the hot products of combustion upward, and the final discharge flue that discharges said products when exhausted into said bath deodorizing tank, substantially as shown and described.

5. In a deodorizing heating apparatus, the combination of the air supply pipe, the perforated base of the heater, the burner 25 and the supply pipe for said burner, the casing 24 inclosing the burner and perforated base, the surmounting deodorizing water tank on the casing, the flues, chambers and ports that precipitate the products of combustion when exhausted into said deodorizing water tank, the tubes and chambers that transmit air in the process of heating, and the transmission pipe 9, substantially as and for the purpose set forth.

6. In a deodorizing heating apparatus, the combination of the system of heaters and their hoods and transmission tubes, a casing surrounding said heaters and tubes, the deodorizing water tank 42 that surmounts said casing, the burner the gas supply of said burner, the system of flues and chambers for the transmission of the hot products of combustion upward the discharge flues that discharge the exhausted products of combustion into said water tank, and the air tubes and chambers with the storage air chambers 95 and 96 that hold and transmit air while heating out of contact with said hot products of combustion, substantially as shown and described.

LAURENCE J. TRACY.

In presence of—
BENJN. A. KNIGHT,
A. M. EBERSOLE.